(12) United States Patent
Wada (10) Patent No.: US 7,317,458 B2
(45) Date of Patent: Jan. 8, 2008

(54) IMAGE DISPLAY APPARATUS, IMAGE DISPLAY PROGRAM, IMAGE DISPLAY METHOD, AND RECORDING MEDIUM FOR RECORDING THE IMAGE DISPLAY PROGRAM

(75) Inventor: Toshiaki Wada, Tama (JP)

(73) Assignee: Olympus Corporation, Tokyo (JP)

( * ) Notice: Subject to any disclaimer, the term of this patent is extended or adjusted under 35 U.S.C. 154(b) by 2 days.

(21) Appl. No.: 11/364,756

(22) Filed: Feb. 28, 2006

(65) Prior Publication Data

US 2006/0146065 A1    Jul. 6, 2006

Related U.S. Application Data

(63) Continuation of application No. PCT/JP2004/012909, filed on Aug. 31, 2004.

(30) Foreign Application Priority Data

Sep. 3, 2003    (JP) .............................. 2003-311914

(51) Int. Cl.
*G09G 5/02* (2006.01)

(52) U.S. Cl. ...................... 345/590; 345/592; 345/593; 345/597

(58) Field of Classification Search ................ 345/590, 345/592, 593, 597

See application file for complete search history.

(56) References Cited

U.S. PATENT DOCUMENTS

2002/0076219 A1 *   6/2002   Uchino ........................ 396/429

FOREIGN PATENT DOCUMENTS

| JP | 11-027688   | 1/1999  |
|----|-------------|---------|
| JP | 11-045334   | 2/1999  |
| JP | 11-185034   | 7/1999  |
| JP | 2000-298467 | 10/2000 |
| JP | 2002-101420 | 4/2002  |
| JP | 2002-133395 | 5/2002  |

* cited by examiner

*Primary Examiner*—Matthew C. Bella
*Assistant Examiner*—Mike Rahmjoo
(74) *Attorney, Agent, or Firm*—Straub and Pokotylo; John C. Pokotylo

(57) ABSTRACT

An image display apparatus includes a display unit that arranges and displays display images of a plurality of original images in a plurality of display areas on a display so as to be comparable with each other, an operation input unit that sets a color temperature of the display image independently every display image or interlockingly with respect to the display images on photographing data or information on the color temperature set in the past, and a display-color correcting unit that generates the display image whose color temperature has been corrected on the basis of the setting by the operation input unit, displays the generated display image displayed in the display area on the display via the display unit, and corrects the color temperature of the original image so as to match that of the display image upon the storing operation.

48 Claims, 6 Drawing Sheets

IMAGE DISPLAY APPARATUS, IMAGE DISPLAY PROGRAM, IMAGE DISPLAY METHOD, AND RECORDING MEDIUM FOR RECORDING THE IMAGE DISPLAY PROGRAM

CROSS REFERENCES TO RELATED APPLICATIONS

This application is a continuation application of PCT/JP2004/012909 filed on Aug. 31, 2004 and claims the benefit of Japanese Application No. 2003-311914 filed in Japan on Sep. 3, 2003, the entire contents of each of which are incorporated herein by their reference.

BACKGROUND OF THE INVENTION

1. Field of the Invention

The present invention relates to an image display apparatus, an image display program, an image display method, and a recording medium for recording the image display program.

2. Description of the Related Art

Recently, the development of the Internet increases the demand for showing an image on a homepage, and a digital camera for easily photographing a digital still image has been widely spread. Further, the digital camera improves its photography standing in the professional field including news photography and commercial photography as well as in the amateur field because an image can be sent to a newspaper company via communication without the development of the image, the development of an image pickup device having a large number of pixels enables the photographing of an image with the same precision as that of silver-halide photography, and the photo can be easily digital-processed.

Upon selecting the image photographed by the digital camera used for a post card by an amateur photographer, or selecting the image to be posted on a magazine by a professional photographer, similarly to a photo or film photographed by a silver-halide film camera, a plurality of images are arranged and are compared with each other.

As an example of the technology for the above comparison, Japanese Unexamined Patent Application Publication No. 11-45334 discloses an image display and comparing method comprising the steps of: displaying a plurality of images on a display apparatus on the basis of a plurality of sets of image data corresponding to the plurality of images; selecting any of the plurality of images as a reference image; setting a processing parameter for predetermined image processing of the reference image; executing the predetermined image processing of the reference image on the basis of the processing parameter and displaying on the display apparatus the image after the predetermined image processing; and executing the predetermined image processing of images excluding the reference image from the plurality of images on the basis of the processing parameter and displaying on the display apparatus the image after the predetermined image processing.

The operating efficiency on processing and comparing the selected plurality of images is improved by enlargement/reduction, movement, area cutting-out, and rotation while using the plurality of images arranged and displayed in interlocking therewith.

However, as disclosed in Japanese Unexamined Patent Application Publication No. 11-45334, only the operation for interlockingly enlarging or reducing a plurality of images does not necessarily facilitate the comparison of images. That is, upon capturing the same object with different digital cameras, the color temperatures of the images are different. Further, even with the same digital camera, the color of a light source changes depending on the time, and the color temperature of the image is therefore varied.

In the comparison of the images, the color temperature may be different as above-described. Since the images are to be compared without the difference of the color temperatures, a technology for easily comparing the images corresponding to the above case is required.

SUMMARY OF THE INVENTION

According to the present invention, an image display apparatus for displaying a plurality of images in a plurality of display areas on one or a plurality of displays, comprises: an image display unit that displays display images of a plurality of original images in the plurality of display areas, so as to be comparable with each other; a color-temperature setting unit that selects whether a color temperature of the display image to be displayed in the display area is independently set every display area or, upon setting a color temperature of the display image in one of the plurality of display areas, a color temperature of the display image to be displayed in the display area is set interlockingly with respect to a color temperature of the display image in at least one of other display areas; and a display-image correcting unit that generates the display image whose color temperature is corrected from the original image on the basis of the setting of the color-temperature setting unit, and displays the generated display image in the display area.

Further, according to the present invention, an image display program for displaying a plurality of images in a plurality of display areas on one or a plurality of displays, doing the following: displaying display images of a plurality of original images in the plurality of display areas, so as to be comparable with each other; selecting whether a color temperature of the display image to be displayed in the display area is independently set every display area or, upon setting a color temperature of the display image in one of the plurality of display areas, a color temperature of the display image to be displayed in the display area is set interlockingly with a color temperature at least one of the display images in other display areas; and generating the display image whose color temperature is corrected from the original image on the basis of the setting of the color-temperature setting unit, and displaying the generated display image in the display area.

Furthermore, according to the present invention, an image display method for displaying a plurality of images in a plurality of display areas on one or a plurality of displays, comprises: displaying display images of a plurality of original images in the plurality of display areas, so as to be comparable with each other; selecting whether a color temperature of the display image to be displayed in the display area is independently set every display area or, upon setting a color temperature of the display image in one of the plurality of display areas, a color temperature of the display image to be displayed in the display area is set interlockingly with respect to a color temperature at least one of the display images in other display areas; and generating the display image whose color temperature is corrected from the original image on the basis of the setting of the color-temperature setting unit, and displaying the generated display image in the display area.

In addition, according to the present invention, a recording medium for recording an image display program to display a plurality of images in a plurality of display areas on one or a plurality of displays, performs: displaying display images of a plurality of original images in the plurality of display areas, so as to be comparable with each other; selecting whether a color temperature of the display image to be displayed in the display area is independently set every display area or, upon setting a color temperature of the display image in one of the plurality of display areas, a color temperature of the display image to be displayed in the display area is interlockingly set with respect to a color temperature at least one of the display images in other display areas; and generating the display image whose color temperature is corrected from the original image on the basis of the setting of the color-temperature setting unit, and displaying the generated display image in the display area.

DESCRIPTION OF THE PREFERRED EMBODIMENTS

Hereinbelow, an embodiment of the present invention will be described with reference to the drawings.

Figure 1:
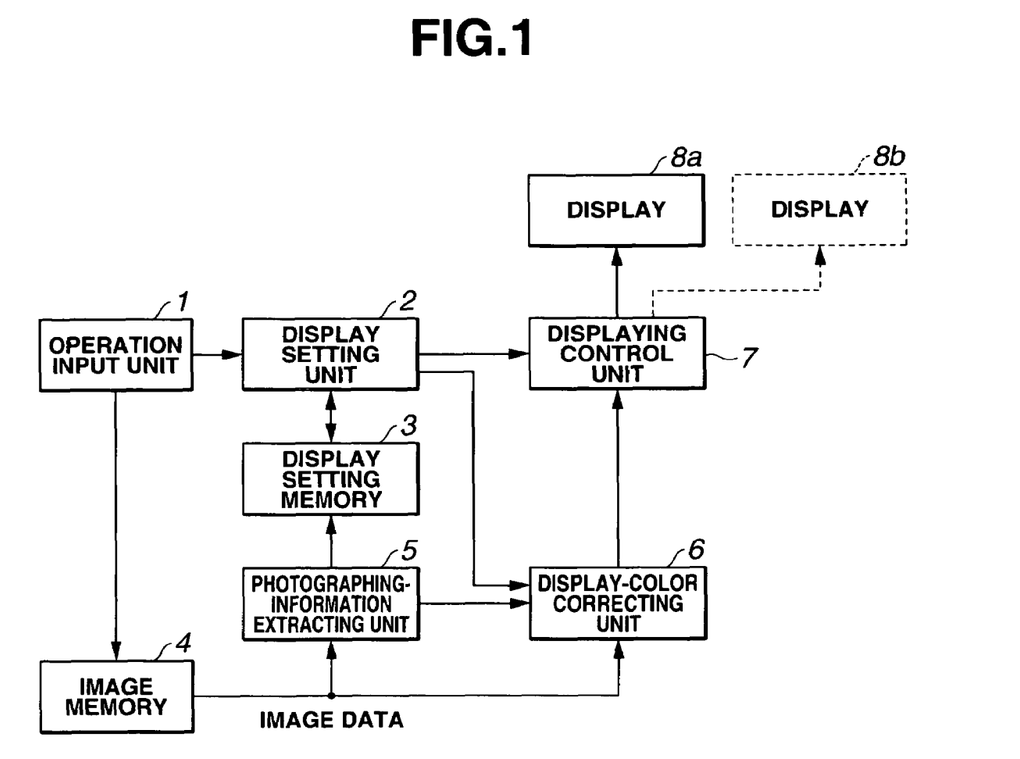
FIG. 1 is a block diagram showing the structure of an image display apparatus according to an embodiment of the present invention.

FIGS. 1 to 7 show an embodiment of the present invention, and FIG. 1 is a block diagram showing the structure of the image display apparatus.

With the image display apparatus, a computer reads an image display program recorded on a recording medium, and executes the image display program. Therefore, referring to FIG. 1, the image display apparatus has functional blocks. However, the image display program is actually executed by a CPU, or is executed under the control operation of the CPU. Note that the present invention is not limited to this and a dedicated hardware may execute the same function. Alternatively, a file-using method may be applied to an apparatus obtained by combining the existing devices, thereby executing the same function. Various recording media for recording the image display program can be used.

Figure 4:
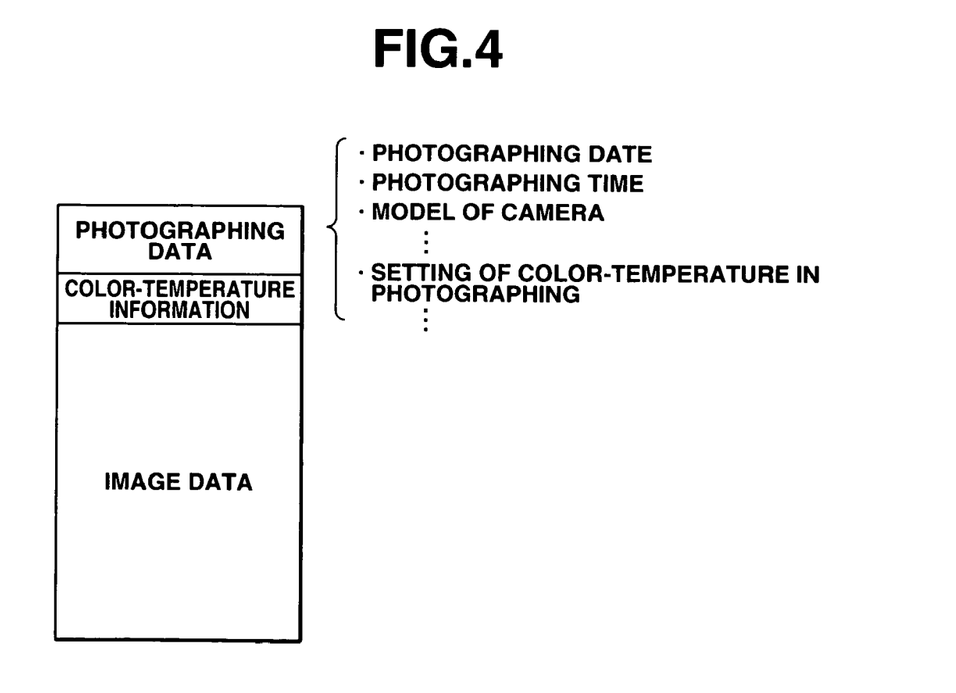
FIG. 4 is a diagram showing the structure of an image file for storing image data according to the embodiment.

The image display apparatus comprises: an operation input unit 1 that inputs the operation by pointing and clicking an operating button displayed on a screen with a mouse; a display setting unit 2 that sets the display operation on the screen in accordance with the operation input from the operation input unit 1; a display setting memory 3 that stores a value set by the display setting unit 2 and further stores photographing information from a photographing-information extracting unit 5, as will be described later; an image memory 4, serving as an image storing unit, which stores an image file input by the downloading operation of the image pickup apparatus or via a memory card; the photographing-information extracting unit 5 that extracts the photographing information (photographing data) from the image file stored in the image memory 4 (a file structure of the image file will be described with reference to FIG. 4); a display-color correcting unit 6, serving as a display-image correcting unit, which generates a display image on the basis of the original image included in the image file of the image memory 4 in accordance with the setting of the display setting unit 2 and corrects the generated color temperature of the display image, and serving as an original image correcting unit, which corrects the original image such that the color temperature of the original image matches the color temperature of the display image in response to an operation input from the operation input unit 1; a displaying control unit 7, serving as an image display unit, which displays the display image after correcting the color temperature, output from the display-color correcting unit 6 in accordance with the setting of the display setting unit 2 on displays 8a and 8b, which will be described later, and serving as a color temperature display unit; and the displays 8a and 8b, serving as display apparatuses, which display the image or a program screen under the control operation of the displaying control unit 7.

Note that the display may use the single display 8a only. Alternatively, the images may be displayed on a plurality of the displays 8a and 8b connected and may be compared.

Figure 2:
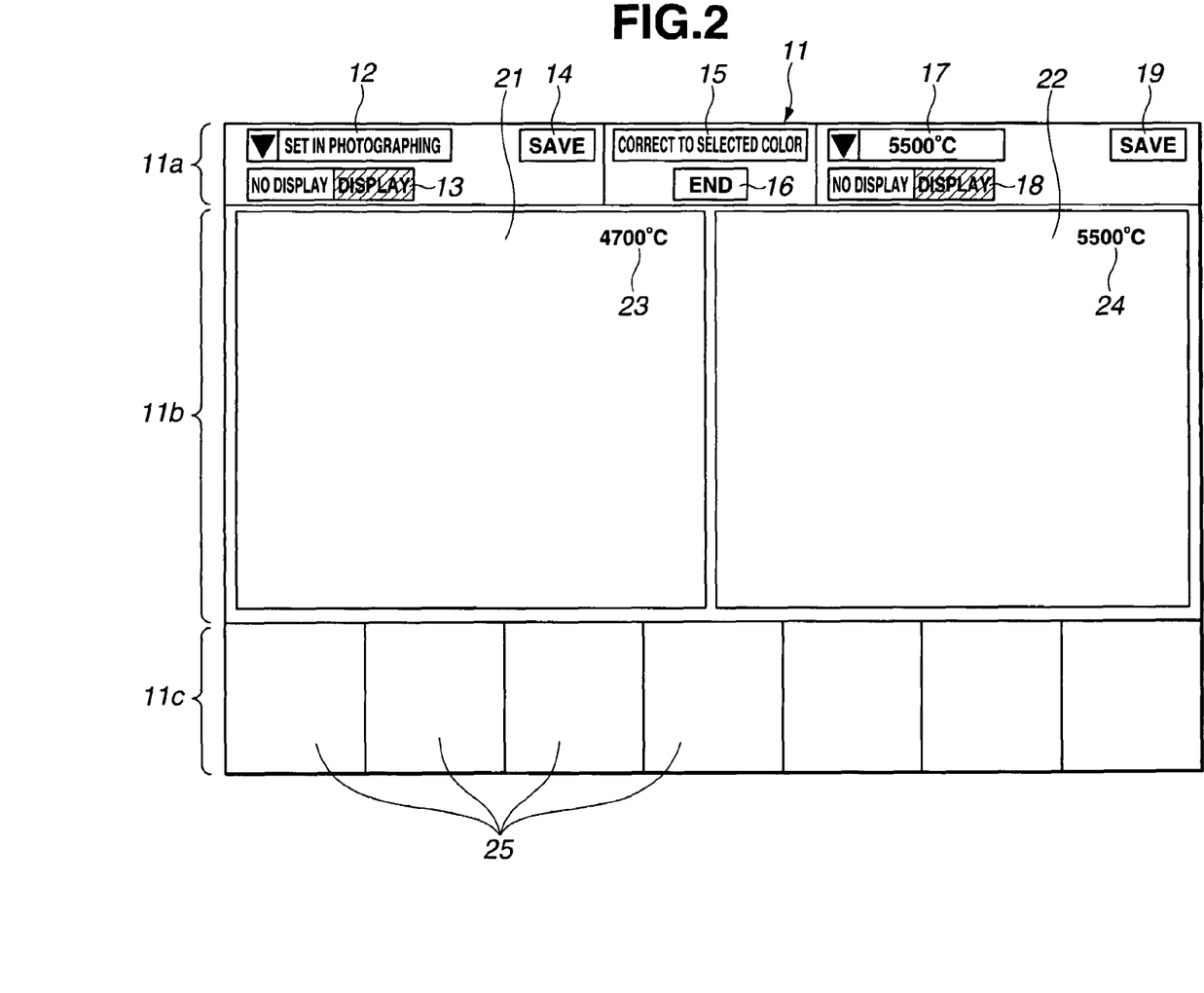
FIG. 2 is a diagram showing a screen of an image display program according to the embodiment.

Next, FIG. 2 is a diagram showing a screen of the image display program.

The screen indicates a screen of the image display program, which is displayed, as one window, upon executing the image display program, for example, on a multi-window-type operating system having a graphic user interface.

A window 11 displays: an operating-button area 11a in which various operating buttons are arranged; a virtual-light box area 11b for arranging and displaying two images and comparing the two images; and a thumbnail area 11c for arranging and displaying a plurality of thumbnail images of the image file stored in the image memory 4.

The virtual-light box area 11b includes, in this case, two display areas for displaying the image, i.e., display areas 21 and 22 arranged with substantially the same size. The display areas 21 and 22 can display color temperature information 23 and 24 of the display images on the displaying control unit 7, serving as a color-temperature display unit. The color temperature information 23 and 24 switches the display/no-display operation, which will be described later.

The operation-button area 11a includes: an operation button for operation of the display area 21; an operation button for operation of the display area 22; and operation buttons for operation of both the display areas 21 and 22 or for operation of the image display program. First, the operation button for the display area 21 includes: a color-balance setting list box 12, serving as a color-temperature setting unit, which sets the color balance of the image displayed in the display area 21 with a color temperature or another set value; a color-temperature information display/no-display button 13 which switches the display/no-display for off-operation of the color-temperature information 23; and a store button 14 that generates the original image of the same color balance as that of the display image currently-displayed in the display area 21 and saves the generated image as an image file. Similarly, the operation button of the display area 22 includes: a color-balance setting list box 17, serving as a color temperature setting unit, which sets the color balance of the image displayed in the display area 22 with a color temperature or another set value; a color temperature information display/no-display button 18 that switches the display/no-display operation of the color-temperature information 24; and a save button 19 that generates the original image of the same color balance as that of the display image currently-displayed in the display area 22 and saves the image as an image file. Further, as operation buttons of both the display areas 21 and 22, there are provided: a correct button 15 which corrects the color temperature of the selected area such that a region in a selected one of the display areas 21 and 22 has the same color-temperature as that of a region corresponding to the selected region in the other display area; and an end button 16 which ends the image display program.

Further, the thumbnail area 11c includes a plurality of display areas 25 for displaying thumbnail images of the image files stored in the image memory 4.

Figure 3:
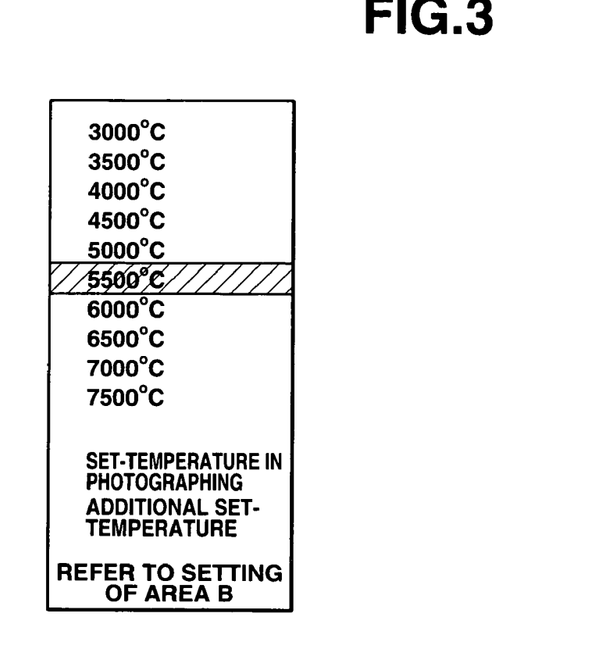
FIG. 3 is a diagram showing an example of a selected item which is listed-up in a color-balance setting list box according to the embodiment.

FIG. 3 is a diagram showing an example of a selected item which is listed-up in the color-balance setting list box.

The color-balance setting list boxes 12 and 17 are pointed and clicked with a mouse, thereby pulling-down and displaying the list shown in FIG. 3.

In the example shown in FIG. 3, the color temperature within 3000° C. to 7500° C. can be selected on the unit basis of 500° C. Alternatively, it is possible to select one of a temperature set in the photographing upon photographing the display image and an additional set-temperature set to the display image by a user. Alternatively, it is possible to select and refer to the setting of the display area 22 (although being displayed as an area B in FIG. 3 as a display example of the color-balance setting list box 12, an area A is displayed in the case of the color-balance setting list box 17), as a comparison target of the display area 21.

Next, FIG. 4 is a diagram showing the structure of an image file for storing image data.

The image file stores image data, serving as the original image. Further, the image file stores photographing data and color temperature of the image data, as a header, for example. Information included in the photographing data includes photographing date, photographing time, and the model of a digital camera, serving as the image pickup apparatus. Further, the information includes information on the setting of the color temperature in the photographing. In addition to the photographing data, the header stores the color temperature information on the image data. While, the photographing data includes the information on the color temperature in the photographing, the color temperature information is used for storing a set value and the like that a user sets after the photographing operation.

Figure 5:
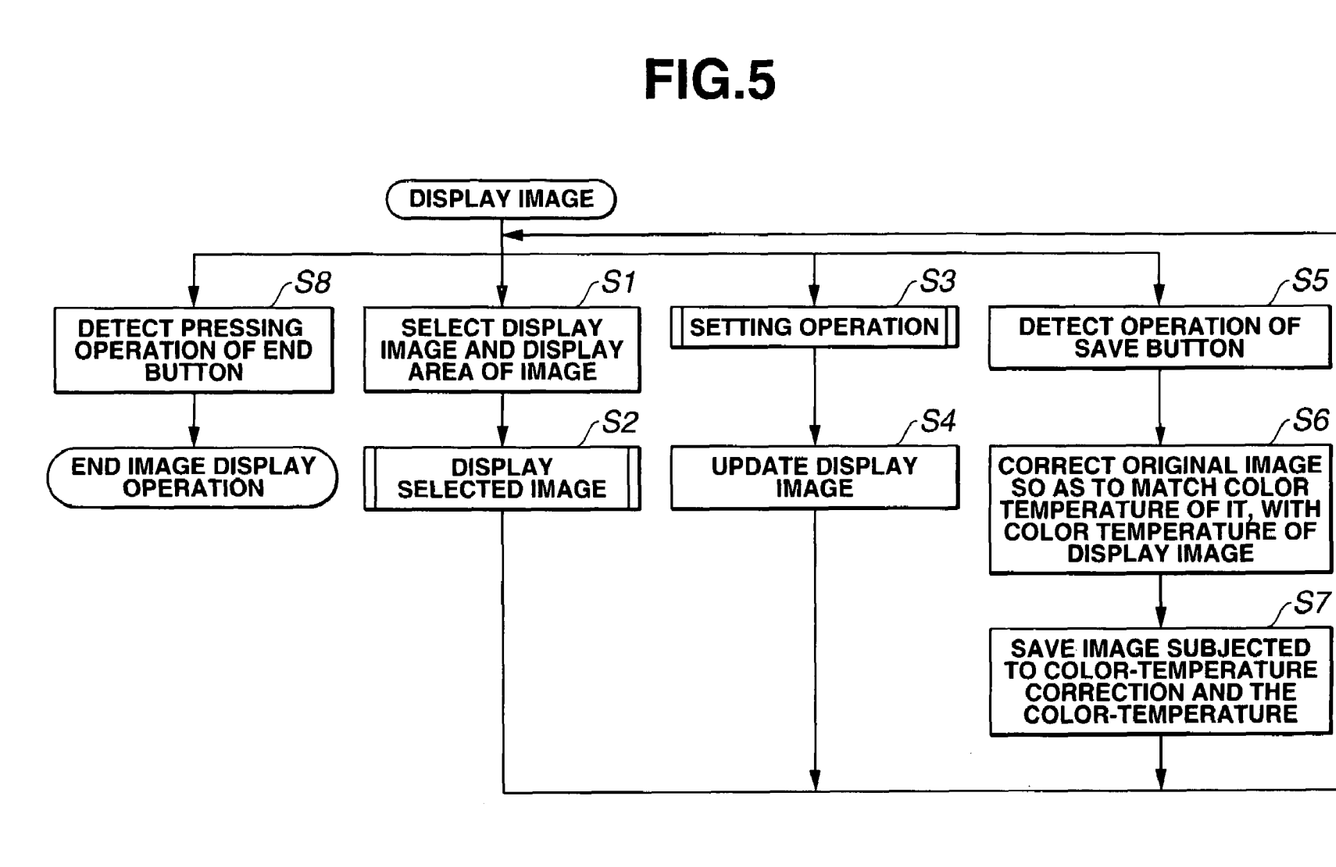
FIG. 5 is a flowchart showing the outline of an image display program according to the embodiment.
Figure 6:
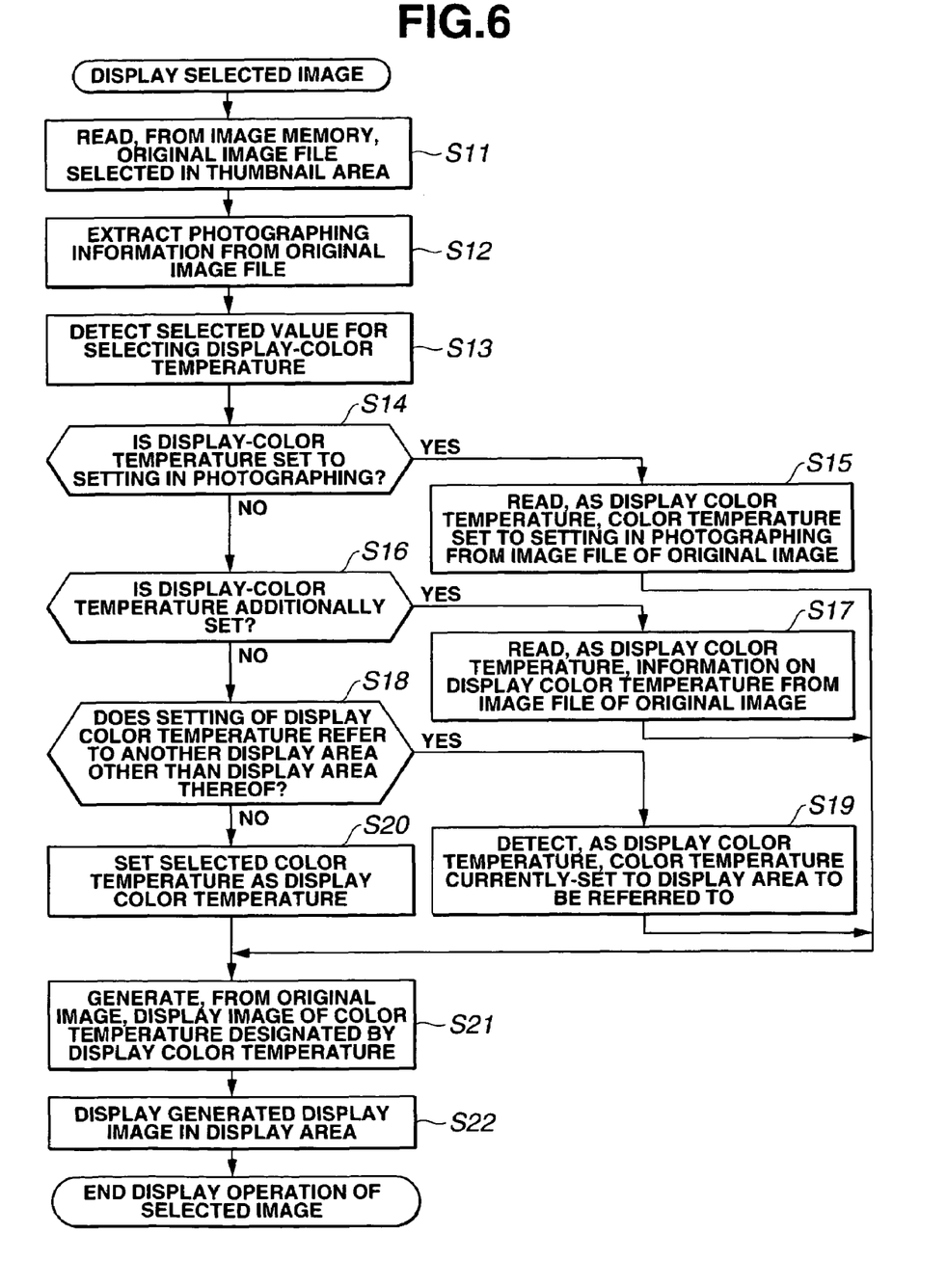
FIG. 6 is a flowchart showing the details of display processing of a selected image shown in FIG. 5 according to the embodiment.
Figure 7:
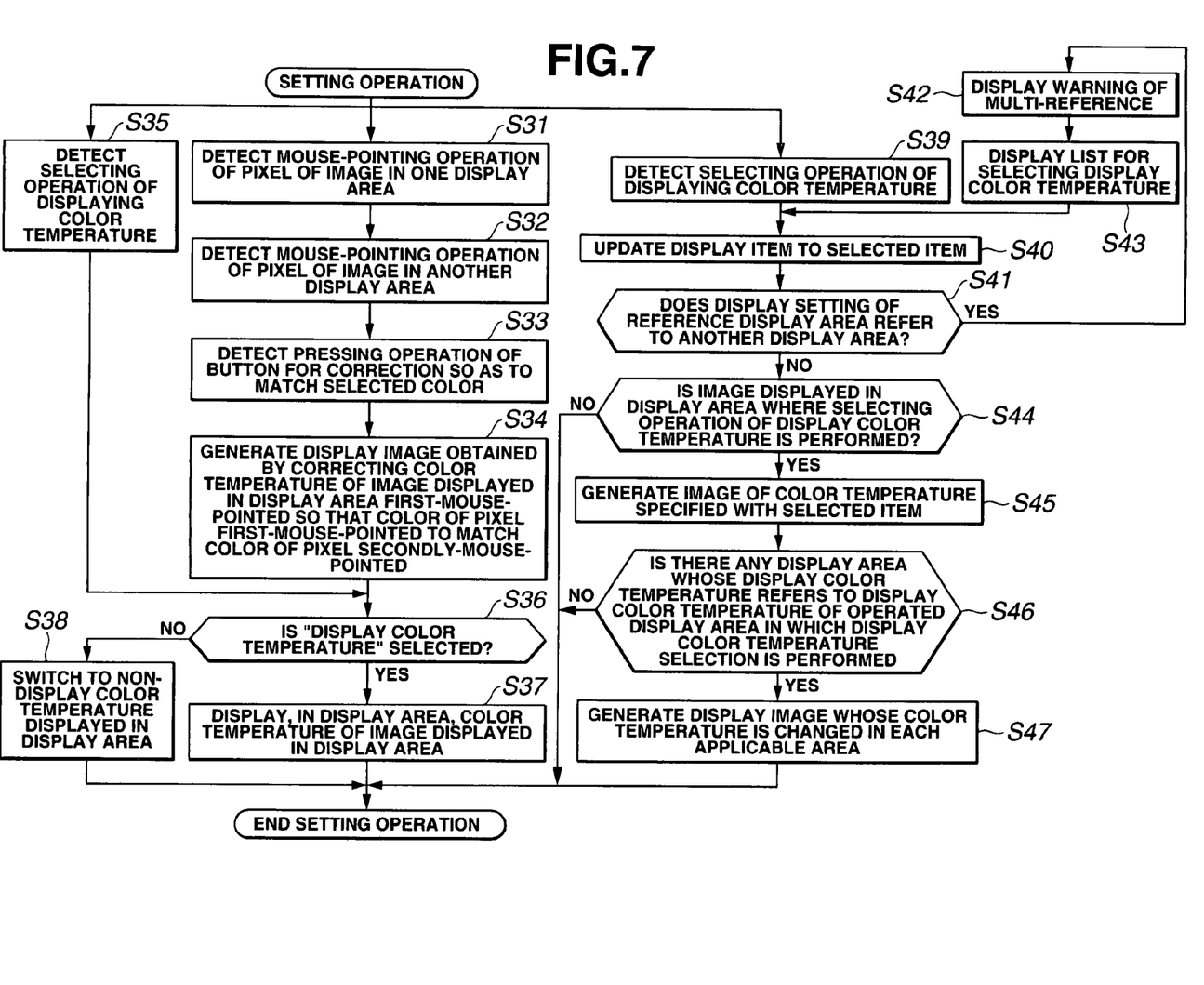
FIG. 7 is a flowchart showing the details of the setting operation processing shown in FIG. 5 according to the embodiment.

Next, a description is given of processing on the image display program with reference to FIGS. 5 to 7.

FIG. 5 is a flowchart showing the outline of an image display program.

The image display program starts, and the image shown in FIG. 2 is displayed. Note that the thumbnail area 11c displays a thumbnail image of the image file stored in the image memory 4 in this case. In this state, the image display program waits for the selection of the image and the operation with the operation buttons.

Herein, the image is dragged and dropped or the like to the display area 21 or the display area 22 from the thumbnail area 11c, thereby selecting the display image and further selecting the display area of the selected image (in step S1).

Then, the processing for displaying the selected image, which will be described later with reference to FIG. 6 is performed (in step S2). The processing returns to the standby mode of various operations after the execution.

When an instruction for setting is input by operating the color-balance setting list boxes 12 and 17, the setting operation in accordance with the input of the instruction is performed, as will be described later with reference to FIG. 7 (in step S3). The displayed image in the display area 21 or/and the display area 22 is updated (in step S4), and the processing returns to the standby mode of various operations.

Further, when the operation of the store buttons 14 and 19 is detected (in step S5), the original image is corrected so that the color temperature of the original image matches that of the display image (in step S6). The original image whose color temperature is corrected and the corrected color temperature are saved, as the image file (in step S7). The processing returns to the standby mode of various operations.

The pressing operation of the end button 16 is detected (in step S8). The image display program ends.

FIG. 6 is a flowchart showing the details of the selected image display processing shown in FIG. 5.

The processing starts, and the image file including the original image corresponding to the thumbnail image selected from the thumbnail area 11c is read from the image memory 4 (in step S11). The photographing information is extracted from the image file (in step S12).

When the display area of the selected image is the display area 21, a value for selecting the display color temperature is detected from the color-balance setting list box 12 and, when the display area of the selected image is the display area 22, a value for selecting the display color temperature is detected from the color-balance setting list box 17 (in step S13).

It is determined whether or not the display color temperature is the temperature set in the photographing (in step S14). When it is determined that the display color temperature is the temperature set in the photographing, the color temperature set in the photographing is read, as the display color temperature, from the photographing data in the image file of the original image (in step S15).

When it is determined in step S14 that the display color temperature is not the temperature set in the photographing, subsequently, it is determined whether or not the display color temperature is the additional-set temperature (in step S16). When it is determined in step S16 that the display color temperature is the additional-set temperature, the color temperature information (refer to FIG. 4) stored in a header area, which is different from the area where the photographing data is stored, is read, as the display color temperature, from the header of the image file of the original image (in step S17).

On the other hand, when it is determined in step S16 that the display color temperature is not the additional-set temperature, it is determined whether or not the display color temperature of the display area to which attention is currently paid is set to refer to another display area or areas except for the display area to which attention is currently paid (in step S18). When it is determined in step S18 that the setting for referring to the other display area or areas is made, the color temperature currently-set to the display area, serving as a reference target, is detected as the display color temperature (in step S19).

On the other hand, when it is determined in step S18 that the setting operation does not refer to the other display area, the selected color temperature is set as the display color temperature (in step S20).

Any of steps S15, S17, S19, and S20 sets the display color temperature. Thereafter, the display-color correcting unit 6 generates, from the original image, the display image of the color temperature designated by the display color temperature (in step S21). The generated display image is displayed in the display area (in step S22).

After that, the processing for displaying the selected image ends, and the processing returns to that shown in FIG. 5.

FIG. 7 is a flowchart showing the details of the setting operation processing shown in FIG. 5.

The setting operation processing starts, and the processing is branched in accordance with the performed operation.

First, it is detected that the pixel of the image in one display area is pointed with the mouse (in step S31). Subsequently, it is detected that the pixel of the image in another display area is pointed with the mouse (in step S32). When the pressing operation of the correct button 15 for correcting the color so as to match the selected color is detected (in step S33), the display image, obtained by correcting the color temperature of the whole display image displayed in the display area first-pointed with the mouse, is generated so that the color of the pixel (average of the color in the case of a region obtained by grouping a plurality of pixels) first-pointed with the mouse matches the color of the pixel (average of the color in the case of a region obtained by grouping a plurality of pixels) secondly-pointed with the mouse (in step S34).

When the processing in step S34 ends or the selection of displaying or not displaying the color temperature is detected (in step S35), it is determined whether or not the color-temperature information display/no-display buttons 13 and 18 are set to "Display color temperature" (in step S36). When it is determined in step S36 that at least one of the color-temperature information display/no-display buttons 13 and 18 is set to "Display color temperature", the color temperature of the display image in the set display area is displayed in the display area (in step S37). When it is determined in step S36 that neither the color-temperature information display/no-display buttons 13 nor 18 is selected, the color temperature displayed in the display area is set to "No display" (in step S38). The setting operation processing ends, and the processing returns to that shown in FIG. 5.

The processing for the setting operation starts, and it is detected that the selection of the display color temperature is performed (in step S39). Then, display items of the color-balance setting list boxes 12 and 17 are updated to a selected one. (in step S40). It is determined whether or not the setting of the display operation refers to another display area, as the reference target (in step S41).

When it is determined in step S41 that setting of the display operation refers to the other display area, a warning of multi-reference is displayed (in step S42), the selecting list of the display color temperature is displayed (in step S43), and the processing returns to that shown in step S40.

When it is determined in step S41 that setting of the display operation does not refer to the other display area, it is determined whether or not the image is displayed in the display area in which the operation for selecting the display color temperature is performed (in step S44).

When it is determined in step S44 that the image is displayed, the image of the color temperature specified with the selected item is generated (in step S45). It is determined whether or not there is any display area among display areas other than the operated display area in which the display color temperature selection is performed, wherein the above-described any display area is the display area which refers to the display color temperature of the operated display area to set as own color temperature (in step S46).

When it determined in step S46 that there is any areas which refer to the display color temperature of the operated display area, the color temperature of the display image is changed so as to match the display color temperature of the operated display area and the image of which display color temperature is generated for each applicable display area (in step S47). When it is determined in step S44 that the image is not displayed in the display area in which the operation for selecting the display color temperature is performed and when it is determined in step S46 that the setting of the display color temperature is not based on the selection for the operated display area, the setting operation processing ends and the processing returns to that shown in FIG. 5.

Note that a plurality of original images as described above may be any of those captured with the same image pickup apparatus and those captured with different image pickup apparatus.

Further, the plurality of display images may be any of those displayed on the same display apparatus as mentioned above and those displayed on different display apparatuses. With different display apparatuses, the color management is executed for the plurality of display apparatuses in advance and the images are displayed with the same color upon setting the same color temperature.

According to the embodiment, when a plurality of images are arranged and are compared with each other and the color temperatures of the images are different, the color temperature can be adjusted, independently of the images or interlockingly with respect to a plurality of images. Thus, the images can be compared with the same color.

Obviously, the present invention is not limited to the above-mentioned embodiment, and can be variously modified and applied without departing the essentials of the present invention.

What is claimed is:

1. An image display apparatus for simultaneously displaying a plurality of images in a plurality of comparison areas on at least one display, the image display apparatus comprising:
   a reduced image display unit that displays, on the at least one display, a plurality of reduced images respectively corresponding to a plurality of original images;
   an image display unit that selects a plurality of images from the reduced images displayed on the at least one display, and simultaneously displays display images of original images corresponding to the plurality of selected reduced images, in the plurality of comparison areas so that the original images of the selected reduced images are comparable with each other;
   a color-temperature setting unit that selects whether:
   a) a color temperature of each of the display images to be displayed in each of the comparison areas is independently set in each of the comparison areas, or
   b) upon setting a color temperature of the display image in one of the plurality of comparison areas, a color temperature of the display image to be displayed in the comparison area is interlockingly set with respect to a color temperature of the display image in at least one other of the comparison areas; and
   a display-image correcting unit that generates the display image whose color temperature is set based on the setting of the color-temperature setting unit, and supplies the generated display image to the at least one display to display the generated display image in one of the comparison areas.

2. The image display apparatus according to claim 1, wherein the color-temperature setting unit sets the color temperature of a display image displayed in a comparison area on the basis of color temperature information included in the photographing information on the original image.

3. The image display apparatus according to claim 2, further comprising:
an original-image correcting unit that corrects by the image display unit the color temperature of the original image corresponding to the display image so as to match the color temperature of the display image displayed on the at least one display.

4. The image display apparatus according to claim 3, further comprising:
an image storing unit that saves, in an image file, the original image corrected by the original-image correcting unit and the color temperature information of the corrected original image.

5. The image display apparatus according to claim 4, wherein the color-temperature setting unit sets the color temperature of the display image on the basis of the color temperature information of the corrected original image stored in the image file, when the original image is that corrected by the original-image correcting unit.

6. The image display apparatus according to claim 1, further comprising:
an original-image correcting unit that corrects by the image display unit the color temperature of the original image corresponding to the display image so as to match the color temperature of the display image displayed on the at least one display.

7. The image display apparatus according to claim 6, further comprising:
an image storing unit that saves, in an image file, the original image corrected by the original-image correcting unit and color temperature information of the corrected original image.

8. The image display apparatus according to claim 7, wherein the color-temperature setting unit sets the color temperature of the display image on the basis of the color temperature information of the corrected original image stored in the image file, when the original image is that corrected by the original-image correcting unit.

9. The image display apparatus according to claim 1, wherein the color-temperature setting unit sets the color temperature of the display image to be displayed in the comparison area on the basis of the color temperature selected from a plurality of predetermined color temperatures.

10. The image display apparatus according to claim 1, wherein when the interlocking setting of the color temperatures is selected, the color-temperature setting unit sets the color-temperature of the display image displayed in the one of the plurality of comparison areas so that the color of a first part in the display image in the one of the comparison areas is equal to the color of a second part in the display image in another of the plurality of comparison areas.

11. The image display apparatus according to claim 1, further comprising:
a color temperature display unit that displays by the image display unit the color temperature of the display image displayed in the one of the comparison areas, as color temperature information, on the at least one display.

12. The image display apparatus according to claim 11, wherein the color temperature comparison areas can switch display/no-display of the color temperature information on the at least one display.

13. An image display program for simultaneously displaying a plurality of images in a plurality of comparison areas on at least one display, the image display program doing the following:
displaying, on the at least one display, a plurality of reduced images respectively corresponding to a plurality of original images;
selecting a plurality of images from the plurality of reduced images displayed on the at least one display, and simultaneously displaying display images of original images corresponding to the plurality of selected reduced images, in the plurality of comparison areas so that the original images of the selected reduced images are comparable with each other;
selecting whether:
a) a color temperature of each of the display images to be displayed in each of the comparison areas is independently set in each of the comparison areas, or
b) upon setting a color temperature of the display image in one of the plurality of comparison areas, a color temperature of the display image to be displayed in the comparison area is interlockingly set with respect to a color temperature of the display image in at least one other of the comparison areas; and
generating the display image, which is corrected from the original image on the basis of the selection of the color-temperature setting, and supplying the generated display image to the at least one display to display the generated display image in one of the comparison areas.

14. The image display program according to claim 13, wherein the color temperature of a display image displayed in a comparison area is set on the basis of color temperature information included in the photographing information on the original image.

15. The image display program according to claim 14, further doing the following:
correcting the color temperature of the original image corresponding to the display image so as to match the color temperature of the display image displayed on the at least one display.

16. The image display program according to claim 15, further doing the following:
storing and saving, in an image file, the corrected original image whose color temperature has been matched that of the display image and the color temperature information of the corrected original image.

17. The image display program according to claim 16, wherein when the original image is the corrected one whose color temperature has been matched that of the display image displayed on the display, the color temperature of the display image can be set on the basis of the color temperature information of the corrected original image, stored in the image tile.

18. The image display program according to claim 13, further doing the following:
correcting the color temperature of the original image corresponding to the display image so as to match the color temperature of the display image displayed on the at least one display.

19. The image display program according to claim 18, further doing the following:
  saving, in an image file, the corrected original image whose color temperature having been matched that of the display image and color temperature information of the corrected original image.

20. The image display program according to claim 19, wherein when the original image is the corrected one whose color temperature has been matched that of the display image displayed on the display, the color temperature of the display image can be set on the basis of the color temperature information on the corrected original image, stored in the image file.

21. The image display program according to claim 13, wherein the color temperature of the display image to be displayed in the comparison area is set on the basis of the color temperature selected from a plurality of predetermined color temperatures.

22. The image display program according to claim 13, wherein when the setting of the color temperatures is interlockingly selected, the color temperature of the display image displayed in the one of the plurality of comparison areas is set so that the color of a first part in the display image in the one of the comparison areas is equal to the color of a second part in the display image in another of the plurality of comparison areas.

23. The image display program according to claim 13, wherein the color temperature of the display image displayed in the one of the comparison areas is displayed, as color temperature information, on the at least one display.

24. The image display program according to claim 23, wherein display/no-display operation of the color temperature information on the at least one display can be switched.

25. An image display method for simultaneously displaying a plurality of images in a plurality of comparison areas on at least one display, the image display method comprising:
  displaying, on the at least one display, a plurality of reduced images respectively corresponding to a plurality of original images;
  selecting a plurality of images from the reduced images displayed on the at least one display, and simultaneously displaying display images of original images corresponding to the plurality of selected reduced images, in the plurality of comparison areas so that the original images of the selected reduced images are comparable with each other;
  selecting whether:
    a) a color temperature of each of the display images to be displayed in each of the comparison areas is independently set in each of the comparison areas, or
    b) upon setting a color temperature of the display image in one of the plurality of comparison areas, a color temperature of the display image to be displayed in the comparison area is interlockingly set with respect to a color temperature of the display image in at least one other of the comparison areas; and
  generating the display image, whose color temperature is set based on the selection of the color-temperature setting, and supplying the generated display image to the at least one display to display the generated display image in one of the comparison areas.

26. The image display method according to claim 25, wherein the color temperature of a display image displayed in a comparison area is set on the basis of color temperature information included in the photographing information on the original image.

27. The image display method according to claim 26, further comprising:
  correcting the color temperature of the original image corresponding to the display image so as to match the color temperature of the display image displayed on the at least one display.

28. The image display method according to claim 27, further comprising:
  storing and saving, in an image file, the corrected original image whose color temperature has been matched that of the display image and the color temperature information of the corrected original image.

29. The image display method according to claim 28, wherein when the original image is the corrected one whose color temperature has been matched that of the display image displayed on the display, the color temperature of the display image can be set on the basis of the color temperature information of the corrected original image, stored in the image file.

30. The image display method according to claim 25, further comprising:
  correcting the color temperature of the original image corresponding to the display image so as to match the color temperature of the display image displayed on the at least one display.

31. The image display method according to claim 30, further comprising:
  storing and saving, in an image file, the corrected original image whose color temperature has been matched that of the display image and color temperature information of the corrected original image.

32. The image display method according to claim 31, wherein when the original image is the corrected one whose color temperature has been matched that of the display image displayed on the display, the color temperature of the display image can be set on the basis of the color temperature information on the corrected original image, stored in the image file.

33. The image display method according to claim 25, wherein the color temperature of the display image to be displayed in the comparison area is set on the basis of the color temperature selected from a plurality of predetermined color temperatures.

34. The image display method according to claim 25, wherein when the interlocking setting of the color temperatures is selected, the color temperature of the display image displayed in the one of the plurality of comparison areas is set so that the color of a first part in the display image in the one of the comparison areas is equal to the color of a second part in the display image in another of the plurality of comparison areas.

35. The image display method according to claim 25, wherein the color temperature of the display image displayed in the one of the comparison areas is displayed, as color temperature information, on the at least one display.

36. The image display method according to claim 35, wherein display/no-display of the color temperature information on the at least one display can be switched.

37. A recording medium for recording an image display program to simultaneously display a plurality of images in a plurality of comparison areas on at least one display, the recording medium for recording the image display program performing the following:
  displaying, on the at least one display, a plurality of reduced images respectively corresponding to a plurality of original images;

selecting a plurality of images from the plurality of reduced images displayed on the at least one display, and simultaneously displaying display images of original images corresponding to the plurality of selected reduced images, in the plurality of comparison areas so that the original images of the selected reduced images are comparable with each other;

selecting whether:

a) a color temperature of each of the display images to be displayed in each of the comparison areas is independently set in each of the comparison areas, or b) upon setting a color temperature of the display image in one of the plurality of comparison areas, a color temperature of the display image to be displayed in the comparison area is interlockingly set with respect to a color temperature of the display image in at least one other of the comparison areas; and generating the display image, which is corrected from the original image on the basis of the selection of the color-temperature setting, and supplying the generated display image to the at least one display to display the generated display image in one of the comparison areas.

38. The recording medium for recording an image display program according to claim 37, wherein the color temperature of a display image displayed in a comparison area is set on the basis of color temperature information included in the photographing information on the original image.

39. The recording medium for recording an image display program according to claim 38, further performing:

correcting the color temperature of the original image corresponding to the display image so as to match the color temperature of the display image displayed on the at least one display.

40. The recording medium for recording an image display program according to claim 39, further performing:

storing and saving, in an image file, the corrected original image whose color temperature has been matched that of the display image and the color temperature information of the corrected original image.

41. The recording medium for recording an image display program according to claim 40, wherein when the original image is the corrected one whose color temperature has been matched that of the display image displayed on the display, the color temperature of the display image can be set on the basis of the color temperature information of the corrected original image, stored in the image file.

42. The recording medium for recording an image display program according to claim 37, further performing:

correcting the color temperature of the original image corresponding to the display image so as to match the color temperature of the display image displayed on the at least one display.

43. The recording medium for recording an image display program according to claim 42, further performing:

storing and saving, in an image file, the corrected original image whose color temperature has been matched that of the display image and color temperature information of the corrected original image.

44. The recording medium for recording an image display program according to claim 43, wherein when the original image is the corrected one whose color temperature has been matched that of the display image displayed on the display, the color temperature of the display image can be set on the basis of the color temperature information on the corrected original image, stored in the image file.

45. The recording medium for recording an image display program according to claim 37, wherein the color temperature of the display image to be displayed in the comparison area can be set on the basis of the color temperature selected from a plurality of predetermined color temperatures.

46. The recording medium for recording an image display program according to claim 37, wherein when the interlocking setting of the color temperatures is selected, the color temperature of the display image displayed in the one of the plurality of comparison areas is set so that the color of a first part in the display image in the one of the comparison areas is equal to the color of a second part in the display image in another of the plurality of comparison areas.

47. The recording medium for recording an image display program according to claim 37, wherein the color temperature of the display image displayed in the one of the comparison areas is displayed, as color temperature information, on the at least one display.

48. The recording medium for recording an image display program according to claim 47, wherein display/no-display of the color temperature information on the at least one display can be switched.

* * * * *